Nov. 15, 1955
H. G. PAYNTON, SR
2,723,506
TAPERING MACHINE
Filed July 16, 1953
2 Sheets—Sheet 1
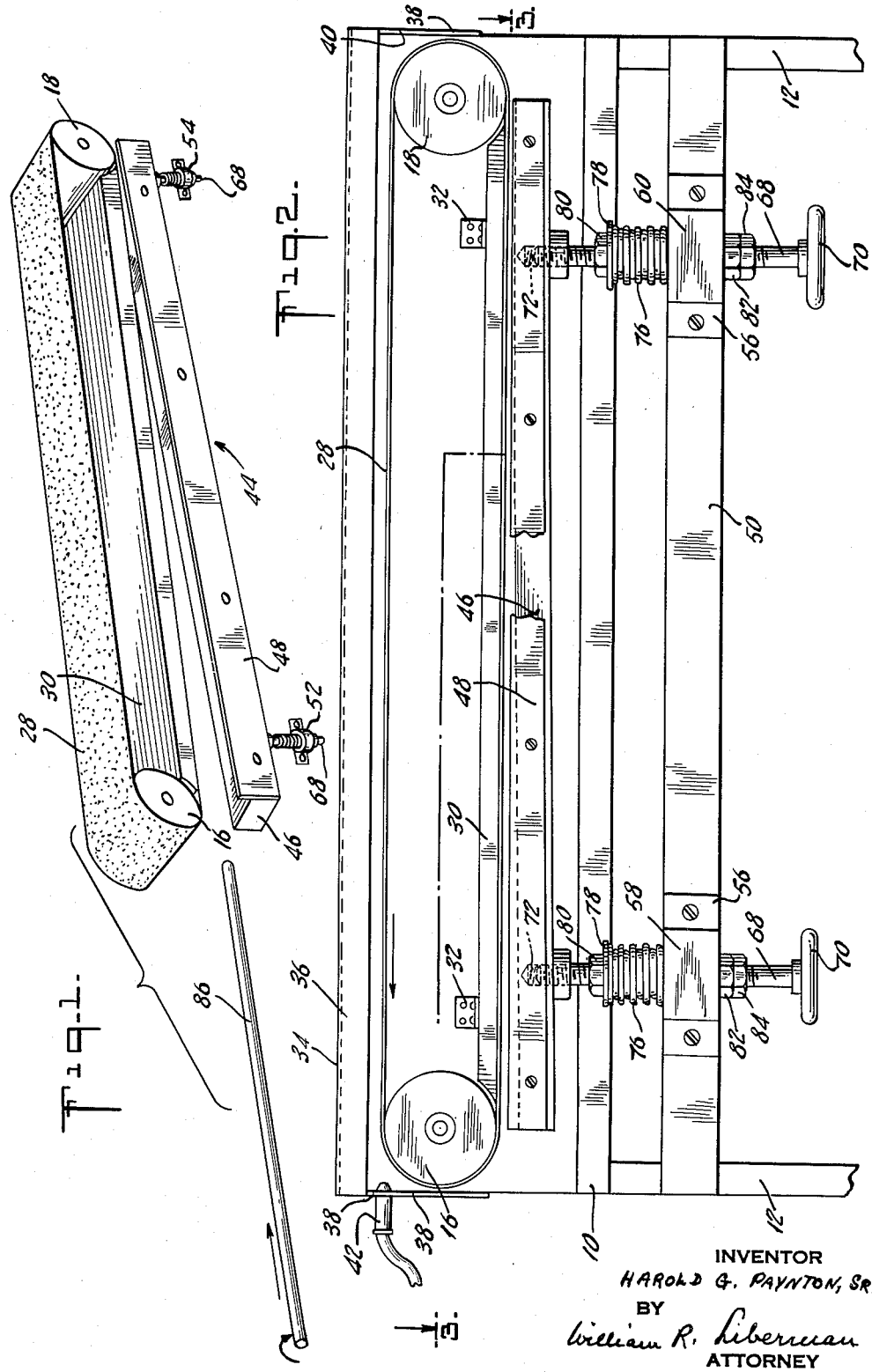
INVENTOR
HAROLD G. PAYNTON, SR.
BY
William R. Lieberman
ATTORNEY

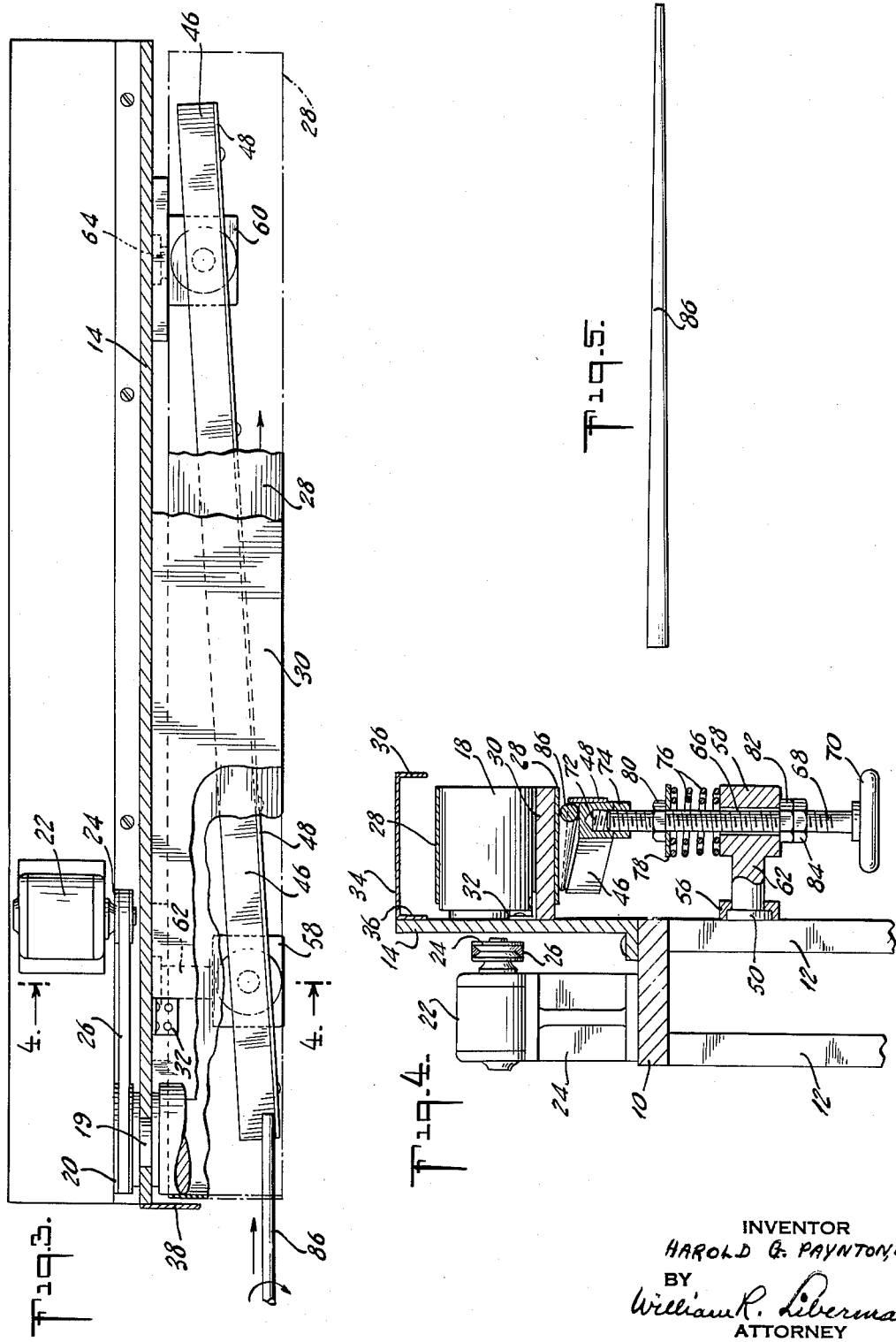

United States Patent Office 2,723,506
Patented Nov. 15, 1955

2,723,506

TAPERING MACHINE

Harold G. Paynton, Sr., Manasquan, N. J.

Application July 16, 1953, Serial No. 368,348

5 Claims. (Cl. 51—141)

The present invention relates to an improved machine for tapering articles, and it relates more particularly to an improved machine for imparting a gentle taper to elongated articles such as fishing poles and the like, although not limited to such specific articles.

There are many slender elongated articles which require for their proper use and manipulation a gentle uniform axial taper. Typical of such articles is the fishing pole, which should be inwardly tapered from the base to the tip in order that the pole shall possess the desirable physical characteristics. With the advent of the so-called glass fishing rod, this taper has assumed a greater importance and has presented a greater problem. A conventional method of producing a tapered glass fishing rod is to mold or cast the rod in its final tapered shape in a corresponding mold. The so-called glass fishing rod is formed of an organic thermoplastic material such as the well-known polyesters, for example, Pittsburgh Plate Glass Co.'s Selectron #5086 having a glass fiber filler (generally oriented along the length of the rod). The aforesaid method of producing glass fishing rods possess numerous drawbacks since it is highly inflexible and requires expensive and extensive equipment and intricate techniques. A separate mold is required for each size and shape of rod. It has been proposed to grind the taper in the rod starting with a standard cylindrical glass rod of uniform transverse cross-section, but heretofore satisfactory, flexible and inexpensive equipment has not been available for such purposes.

It is thus a principal object of the present invention to provide an improved machine for tapering elongated articles.

Another object of the present invention is to provide an improved machine for producing tapered fishing rods.

Still another object of the present invention is to provide an improved machine for imparting a gentle axial taper to long rods, which machine is simple, rugged, inexpensive and highly versatile.

A further object of the present invention is to provide a simple, rugged and inexpensive machine for forming uniformly tapered glass fiber-filled plastic fishing rods from corresponding cylindrical rods.

Still a further object of the present invention is to provide an improved, simple, rugged and inexpensive machine for tapering long rods, which machine may be easily and rapidly adjusted to control the degree of taper imparted to said rods.

The above and other objects of the present invention will become apparent from a reading of the following description taken in conjunction with the accompanying drawings, wherein Figure 1 is a perspective view of a portion of a machine which is a preferred embodiment of the present invention;

Figure 2 is a side elevational view thereof, partially broken away;

Figure 3 is a sectional view taken along line 3—3 of Figure 2;

Figure 4 is a sectional view taken along line 4—4 of Figure 3; and

Figure 5 is a plan view of a finished tapered rod produced on the machine of the present invention.

The present invention broadly contemplates the provision of a machine for imparting a taper to elongated articles, comprising an endless abrasive belt having a substantially flat longitudinal run and means for rotatably supporting an elongated article in engagement with said abrasive belt along said flat run oblique to the direction of said run and at an angle to the plane of the belt along said flat run.

In accordance with a preferred embodiment of the present invention, the abrasive belt is supported in and between a pair of transversely spaced parallel drums, at least one of which is positively rotated to thereby drive the abrasive belt. A flat bed plate bears against the inner surface of the abrasive belt along its longitudinal run for substantially the full length of the run. A work support is mounted in confronting relationship to the abrasive belt along the longitudinal run, extending obliquely to and for substantially the length of the run and is provided with a base portion facing the belt and a lip directed toward the abrasive belt defining a lateral guide. The work support is mounted on a pair of spaced posts for movement to and from the surface of the abrasive belt, and spring urges the work piece support toward the abrasive belt. Further, means are provided to limit the movement of the support toward the belt to a final position in which the work piece support is at an angle to the plane of the belt along its longitudinal run.

Reference is now made to the drawing which illustrates a preferred embodiment of the present invention and wherein the numeral 10 generally designates a base plate supported at a convenient height by a plurality of suitably spaced vertical legs 12 located at the corners of the base plate 10. Mounted upon the upper face of the base plate 10 is an upwardly directed bracket plate 14 which is disposed along a side edge of the base 10 and extends the full length thereof. A pair of parallelled horizontal drums 16 and 18 respectively are suitably rotatably mounted on the bracket plate 14 substantially at the same level and projecting outwardly therefrom. The drum 18 is an idler drum whereas the drum 16 is driven, and is provided with a shaft 19 projecting through the bracket plate 14 and having a pulley 20 mounted therein and keyed thereto. A suitable electric motor 22, whose drive shaft is at substantially the level of the shaft 19 of the drum 16, is mounted on a motor support 24' which is located in the base plate 10. A pulley 24 keyed to the drive shaft of the electric motor 22 is coupled to the pulley 20 by means of drive belt 26. The electric motor 22 may be connected to a source of current through a conventional switch arrangement to energize the motor 22 and thereby drive the drum 16.

An endless abrasive belt 28 having its outer surface coated with emery, Carborundum or other suitable abrasive of a grade determined by the desired finish to be imparted to the work piece is mounted about and between the drums 16 and 18, the drum 16 being positively driven as aforesaid to advance the lower run of the abrasive belt 28 in a forward direction from left to right as seen in Figures 1 and 2.

Located directly above the lower run of the abrasive belt 28 is a flat bed plate 30 whose bottom face engages the confronting inner face of the abrasive belt 28 and is of substantially the same width as the belt 28 and extends almost into the bights defined by the drums 16 and 18 and the abrasive belt 28. The upper leading and trailing edges of the bed plate 30 are tapered, as shown, and the bed plate is supported in position by means of a pair of brackets 32 secured to the outer side of the bracket plate 14. A guard member and dust shield 34 is mounted along the upper edge of the bracket plate 14 and is substantially channel shaped, having downwardly directed legs 36, the rear leg 36 abutting the side of the bracket plate 14, and the front leg 36 being disposed forward of the front edge of the abrasive belt 28. Depending from the ends of the shield 34 immediately behind and ahead of the respective drums 16 and 18 are walls 38 and 40 which extend to a point just above the bottom run of the abrasive belt 28 and are of about the same width as the shield member 34. An air jet 42 is mounted in the wall 38 and directed along the upper surface of the abrasive belt 28 and is connected to a suitable source of compressed air.

A work holder 44 is located below the lower run of the abrasive belt 28, extending substantially the length thereof, and includes a flat-topped rest bar 46 of rectangular cross-section and a guide member 48 consisting of a vertical flat rigid strip suitably secured to the side wall of rest bar 46, projecting just above the top face thereof and extending its full length.

The support for the work holder 44 includes a horizontal lengthwise extending bar 50 located below the base plate 10 and located between and fixed to legs 12. A pair of horizontally spaced and outwardly directed brackets are firmly supported on the cross bar 50 by means of suitable clamp members 56. The outer ends of the brackets are provided with enlarged heads 58 and 60 respectively which are mounted on and may be integral with shanks 62 and 64, these being of different lengths, the shank 62 at the front of the machine being longer than the shank 64 at the rear of the apparatus an amount somewhat less than the width of the abrasive belt 28.

Formed in each of the bracket heads 58 and 60 is a vertical bore 66 which slidably engages the threaded shank of an adjusting bolt 68, the lower end of which terminates in a handle or knob 70. The upper end of each of the bolts 68 engages a corresponding tapped hole 72 formed in the bottom face of the bar 46 and is secured in such position by a lock nut 74 engaging bolt 68 bearing against the bottom face of the bar 46. A pair of coaxial helical compression springs 76 register with each of the bolts 68 and are trapped between the upper faces of the bracket heads 58 and 60 and the lower face of washers 78 located on the bolts 68 above the springs 76 and adjustably positioned by means of nuts 80 abutting the upper faces of the washers 78. The upper limit of travel of each of the bolts 68 and hence the corresponding end of the bar 46 and work holder 44 may be adjusted by means of a set nut 82 engaging the bolt 68 and abutting the under face of the bracket heads 58 and 60 and fixed in position by means of lock nuts 84 located directly below the set nuts 82.

It is apparent from the above description that the work holder 44 is horizontally oblique to the direction of travel of the abrasive belt 28, so that a major portion of the abrasive surface is made available for use. Furthermore, the vertical angle between the upper surface of the bar 46, in its upwardly urged position, and the plane of the lower surface of the abrasive belt 28 is adjustable, to thereby permit control of the degree of taper imparted to a work piece. Moreover, the upward pressure on the work piece against the abrasive belt 28 may likewise be adjusted by means of the nut 80 and coacting washer 78.

In employing the improved machine described above, the incline of the work holder 44 relative to the grinding surface of the abrasive belt 28 is adjusted in accordance with the desired degree of taper to be imparted to the work piece. This is accomplished by loosening the lock nuts 84 and the set nuts 82, adjusting the set nuts 82 until the angle between the bottom rim of the abrasive belt 28 and the upper surface of the bar 46 is twice the desired degree of taper when the bar is in its spring raised position, whereupon the set nuts 82 are fixed in such position by tightening the lock nuts 84. The screws 80 are then adjusted to obtain the optimum upward pressure on the work holder 44.

In tapering a rod 86, which is preferably of uniform circular cross-section, the trailing end of the rod 86 is clamped in a slowly rotating hand driven or machine driven clutch, and the rod 86 advanced between the work holder 44 and the confronting surface of the driven abrasive belt 28, the leading end of the rod 86 being directed by the guide member 48. The work holder 44 is depressed against the upward pressure of the springs 76 and urges the rod against the abrasive belt 28. As the rod 86 is advanced against and into the region of smaller spacing between the bottom run of belt 28 and the far end of holder 44, it is engaged by a greater part of the width of the abrasive belt 28 by virtue of the angle between the work holder 44 and the direction of movement of the abrasive belt 28, and ground to a uniform. Wear of the belt is maintained at a minimum in my apparatus. After the rod 86 has been advanced its full length while being rotated, the rod, finished and tapered as illustrated in Figure 5 of the drawing, may then be withdrawn and the operation repeated on successive rods.

While there has been described and illustrated a preferred embodiment of the present invention, it is apparent that numerous alterations and omissions may be made without departing from the spirit thereof.

I claim:

1. A machine for imparting a taper to a long work piece comprising a pair of laterally spaced rotatable drums, an endless abrasive belt mounted on and between said drums, means for rotating at least one of said drums to thereby drive said abrasive belt along a lower substantially flat horizontal longitudinal run, a bed plate having a substantially flat surface engaging the inner face of said abrasive belt along said longitudinal run, a pair of longitudinally spaced vertically movable support elements disposed below said longitudinal run, a work holder having a rest surface confronting the abrasive belt and mounted on said support elements, and extending guide means located on said work holder to direct a work piece obliquely to the direction of said longitudinal run, spring means urging said support elements upwardly and means limiting the upward movement of each of said support elements to a position whereby said rest surface is at an angle to the horizontal.

2. A machine in accordance with claim 1, wherein the means limiting the upward movement of said support elements are individually adjustable to permit the control of the spacing of said rest surface relative to said abrasive belt and the angle of said rest surface to the horizontal when said work holder is in its topmost position.

3. A machine in accordance with claim 1, wherein said spring means are adjustable whereby to permit the control of the upward force exerted upon said support elements and said work holder.

4. A machine for imparting a taper to a long work piece comprising a pair of laterally spaced rotatable drums, means for rotating at least one of said drums to thereby drive said abrasive belt along a substantially flat longitudinal run, a longitudinally extending bed plate engaging the inner face of said abrasive belt along said longitudinal run, an elongated work holder confronting said belt and disposed adjacent the longitudinal run thereof and adapted to slidably engage said work piece, guide means disposed along said work holder and extending in a direction oblique to said longitudinal run, means supporting said work holder for movement toward and away from said abrasive belt, means urging said work holder toward said abrasive belt and means limiting the movement of said work holder toward said belt to a position forming an angle to the plane of said belt along said longitudinal run.

5. A machine in accordance with claim 4, wherein said work holder movement limiting means is adjustable to permit variation of the angle of said work holder to the plane of said belt along said longitudinal run.

References Cited in the file of this patent

UNITED STATES PATENTS

| | | |
|---|---|---|
| 250,455 | Savage | Dec. 6, 1881 |
| 561,557 | Bein | June 9, 1896 |
| 598,671 | Driver | Feb. 8, 1898 |
| 975,088 | Thompson | Nov. 8, 1910 |
| 1,590,190 | Heim | June 27, 1926 |
| 2,359,093 | Eastman | Sept. 26, 1944 |
| 2,562,229 | Bell | July 31, 1951 |
| 2,574,349 | Otten | Nov. 6, 1951 |

FOREIGN PATENTS

| | | |
|---|---|---|
| 8,151 | Great Britain | Apr. 4, 1906 |